United States Patent [19]
Tacklind

[11] Patent Number: 5,715,118
[45] Date of Patent: Feb. 3, 1998

[54] AIR ACTUATED LATCHING MECHANISM ROTATIONALLY RESISTANT TO ROTATIONAL SHOCK FORCE

[75] Inventor: Thomas A. Tacklind, San Martin, Calif.

[73] Assignee: Quantum Corporation, Milpitas, Calif.

[21] Appl. No.: 646,420

[22] Filed: May 7, 1996

[51] Int. Cl.⁶ .................... G11B 5/54; G11B 21/22
[52] U.S. Cl. .................................................. 360/105
[58] Field of Search .......................... 360/105, 106, 360/109, 97.01

[56] References Cited

U.S. PATENT DOCUMENTS

| | | | |
|---|---|---|---|
| 4,562,500 | 12/1985 | Bygdnes | 360/105 |
| 4,647,997 | 3/1987 | Westwood | 360/105 |
| 4,692,829 | 9/1987 | Campbell | 360/105 |
| 5,036,416 | 7/1991 | Mastache | 360/105 |
| 5,124,867 | 6/1992 | Kitahori et al. | 360/105 |
| 5,216,662 | 6/1993 | Stefansky et al. | 360/105 |
| 5,274,519 | 12/1993 | Saito et al. | 360/97.01 |
| 5,303,101 | 4/1994 | Hatch et al. | 360/105 |
| 5,319,511 | 6/1994 | Lin | 360/105 |
| 5,363,261 | 11/1994 | Eckberg et al. | 360/105 |
| 5,404,257 | 4/1995 | Alt | 360/105 |
| 5,528,437 | 6/1996 | Mastache | 360/105 |
| 5,543,986 | 8/1996 | Albrecht | 360/105 |
| 5,555,146 | 9/1996 | Hickox et al. | 360/105 |

*Primary Examiner*—Stuart S. Levy
*Assistant Examiner*—David L. Ometz
*Attorney, Agent, or Firm*—John C. Chen

[57] ABSTRACT

An airlock latch assembly for restraining a disk drive actuator when the disk drive is subjected to rotary shock forces includes a first member and a second member rotatably mounted to the disk drive base. The second member engages the first member, preventing the first member from disengaging with the actuator assembly while the disk is not spinning. The two members are mechanically related such that one member can rotate in one direction only when the other member rotates in the opposite direction. The latch assembly also restrains the actuator in its proper position when the disk drive is subject to linear shock forces.

9 Claims, 4 Drawing Sheets

FIG.—1
(PRIOR ART)

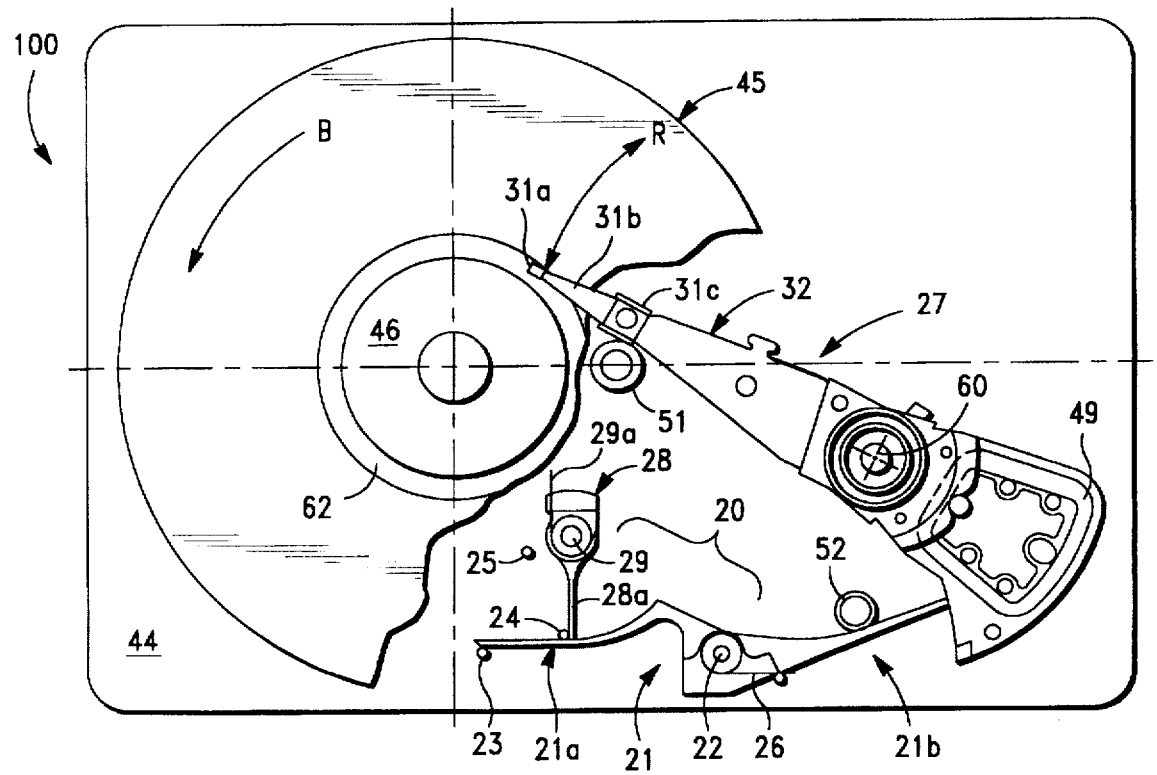
FIG.—3A
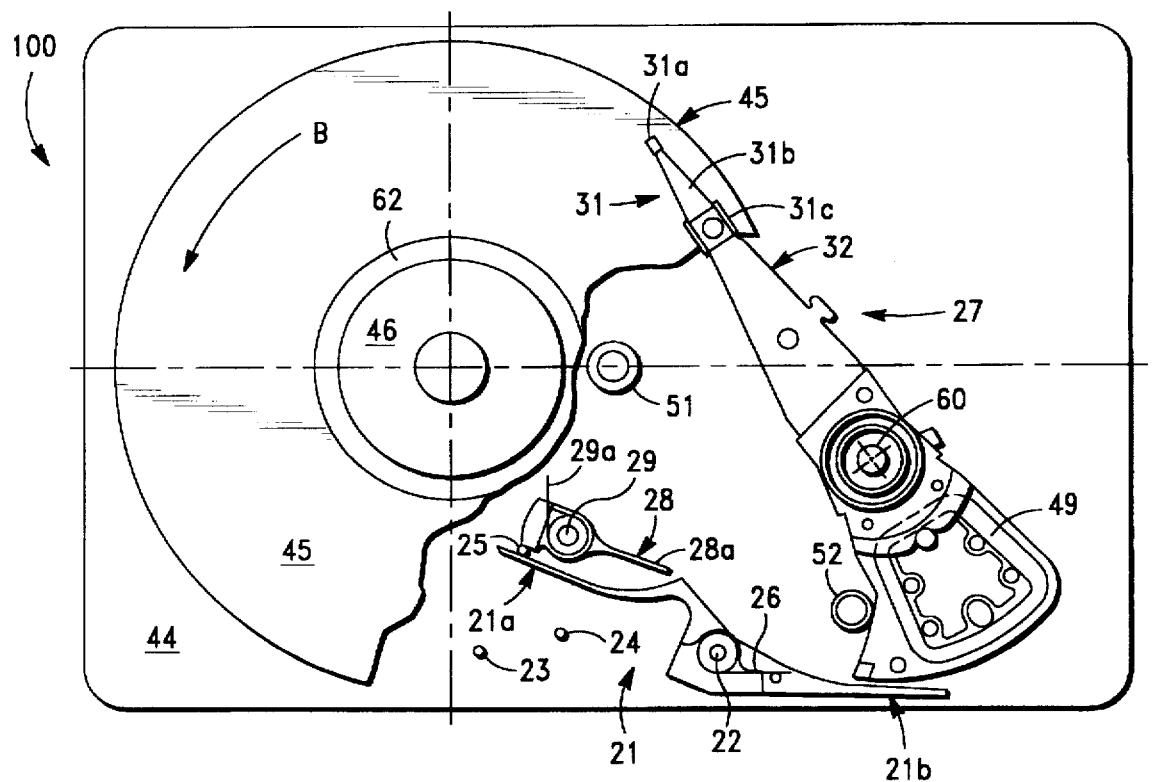
FIG.—3B

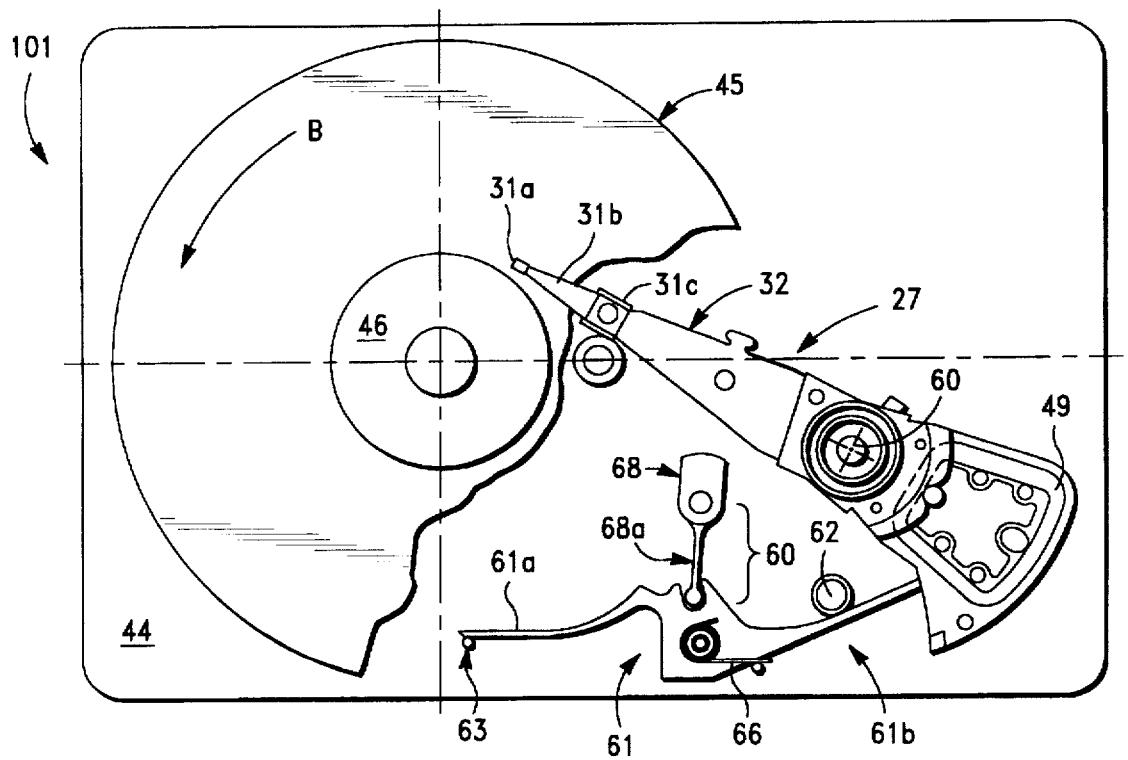
*FIG.—4A*
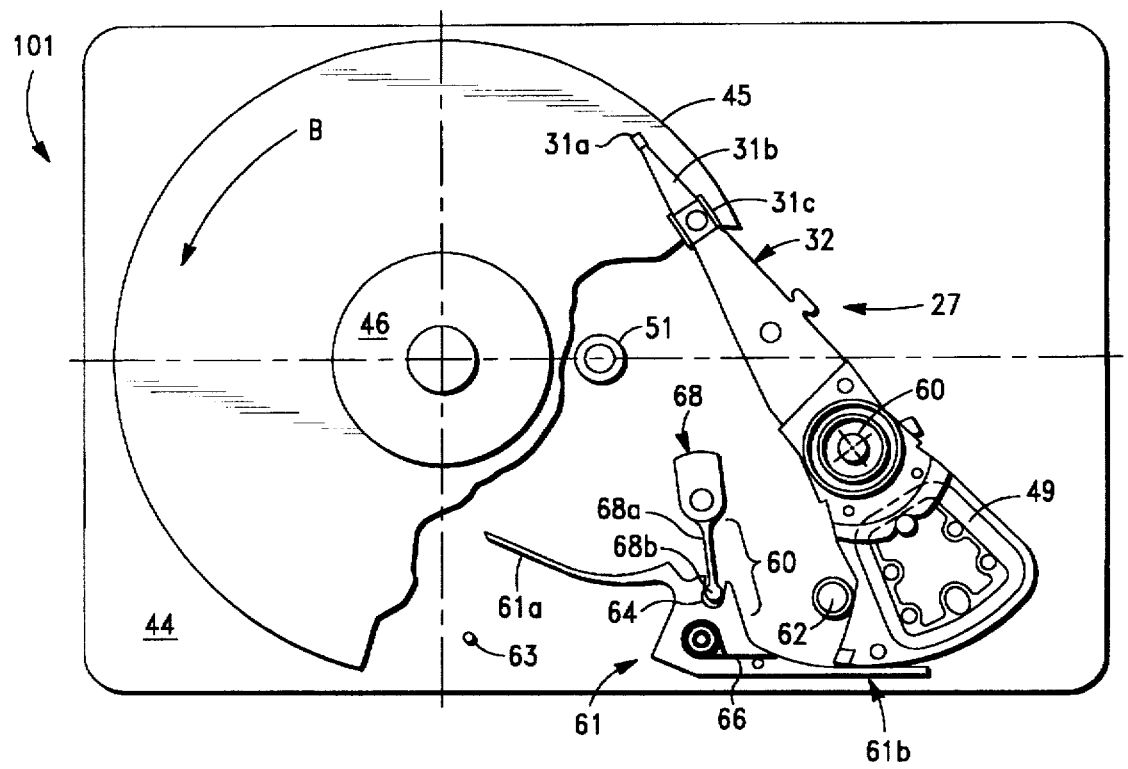
*FIG.—4B*

AIR ACTUATED LATCHING MECHANISM ROTATIONALLY RESISTANT TO ROTATIONAL SHOCK FORCE

FIELD OF THE INVENTION

The present invention relates to actuator latches within hard disk drives. More particularly, the present invention relates to an air actuated latching mechanism which enables an actuator assembly to remain restrained by the actuator latch when the disk drive is subjected to a rotational shock force.

BACKGROUND OF THE INVENTION

In conventional Winchester disk drives, a read/write head or transducer assembly "flies" upon an air bearing or cushion in very close proximity to the rotating surface of the data storage disk. The disk surface carries a thin film magnetic material having a multiplicity of magnetic storage domains that may be recorded and read back by the head. The transducer assembly, which can be any conventional, combination of transducers, sliders and load beams, is positioned and supported proximate the surface of the data storage disk using an actuator. The combination of the transducer assembly and the actuator is known as the transducer actuator or actuator assembly. The actuator supports the load beams and sliders and accurately positions the transducers above the surface of the disk within a "data area" to read and write data from/to the disk. When not in operation, the actuator assembly remains stationary in a "landing zone" along the inner diameter of the disk wherein the transducer rests on the surface of the disk. An actuator latch prevents the actuator assembly from moving into the data area during non-operation. The latch, may include an air vane portion which extends over the surface of the disk and pivots about an axis of rotation. As airflow generated by the rotating disk overcomes a biasing force from e.g. a magnet and moves the latch to release the actuator assembly. Such actuator latches are known as "airlocks".

The disk drive industry is moving towards the adoption of extremely smooth media (rotating recording disk) to enable the read write slider element to fly closer to the magnetic recording disk surface. Although closer flying proximity is desirable for improved read/write performance, a problem remains that if the slider were to come into contact with the smooth surface while the disk is not spinning, a "Jo-block" effect between the smooth disk surface and the slider could effectively adhere the two together. In response to this problem, the disk manufacturing industry has developed what is referred to as "zone textured" media. As the name implies, the landing zone is textured to reduce the coefficient of friction between the slider and disk. Texturing enables the slider to break free of the disk during disk spin-up, without detrimentally affecting the slider and/or disk. Texturing may also be applied to air bearing surfaces of the slider.

FIG. 1 shows a plan view of a somewhat simplified disk drive, incorporating a typical air vane actuator latch 11. The latch 11 includes an air vane portion 12, depicted in a latched position, wherein a transducer 4 rests on a disk 13 at a landing zone 2. As shown in FIG. 1, in order for the transducer 4 to enter a data storage area 3 of the disk 13, air vane actuator latch 11 must first rotate clockwise, to disengage from the actuator assembly 17, followed by a clockwise rotation of the actuator assembly 17.

The latch 11 is specifically designed to be mass balanced about its axis of rotation so that linear shocks will not cause it to rotate and possibly permit the actuator 17 to escape from its latched position. In practice, conventional rotary airlock actuator latches have proven to be reasonably reliable in keeping the actuator assembly latched, provided that the input shock is linear in nature.

However, conventional air vane actuator latching mechanisms such as that of FIG. 1 offer less protection against rotary shock forces. When subjected to rotary shock, which may be described as sudden and rapid rotational movement of the disk drive 10, the respective inertia of the air vane latch 11 and the actuator assembly 17 tend to maintain their relative angular orientation, rather than rotate with a disk drive base 18. Thus, if the base 18 is suddenly rotated counterclockwise, the air vane latch 11 and the actuator 17, will tend to rotate with the base 18. In effect, the latch 11 and actuator 17 undergo a clockwise rotation with respect to the base 18, resulting in the orientation shown in FIG. 2 and an unwanted release of the actuator assembly 17. When the disk 13 is not rotating, release of actuator 17 causes unwanted contact between the slider and the data storage area 3. (FIG. 2 shows this problem) In practice, it is fairly easy to cause the prior air vane latch to fail in response to certain rotary shock forces, more frequently present especially in portable and laptop computers.

Thus, there exits a hitherto unsolved need for an improved, simple and cost efficient latching mechanism which can effectively protect against rotary as well as linear shock forces.

SUMMARY OF THE INVENTION WITH OBJECTS

A general object of the present invention is to provide an improved disk drive airlock actuator latch assembly which overcomes limitations and drawbacks of the prior art by resisting rotary shock forces as well as linear shock forces.

More specifically, it is an object of the present invention to provide an airlock actuator latch assembly which, in a latched position, resists rotation when the disk drive is subjected to sudden rotation.

In accordance with principles of the present invention, an airlock actuator latch assembly includes a first member and a second member. The first member functions much like a conventional airlock, wherein the force of airflow generated by rotating disks impinging against the air vane rotates the first member into an unlatched position, permitting the actuator assembly to move into the data zone. The second member engages the first member, preventing the first member from disengaging with the actuator assembly while the disk is not rotating and is similarly deflectable into the unlatched position by the force of airflow generated by disk rotation. The first member and the second member are rotatably mounted to the disk drive base and are mechanically inter-related such that one member can rotate in one direction only when the other member rotates in the opposite direction. In addition, the first member and the second member are each balanced about their respective axes of rotation, such that the airlock latch assembly remains latched against the actuator assembly when the disk drive is subjected to a linear shock force.

BRIEF DESCRIPTION OF THE DRAWINGS

In the Drawings:

FIG. 3a is a top plan diagrammatic view of a simplified head and disk assembly of a hard disk drive, including one preferred embodiment of an airlock actuator latch assembly in accordance with principles of the present invention, shown in a latched position.

FIG. 3b is a top plan diagrammatic view of the airlock actuator latch assembly of 3a, shown in an unlatched position.

FIG. 4a is a top plan diagrammatic view of a disk drive showing another preferred embodiment of the airlock actuator latch assembly in accordance with principles of the present invention, shown in the latched position.

FIG. 4b is a top plan diagrammatic view of the airlock actuator latch assembly of FIG. 4a, shown in the unlatched position.

DETAILED DESCRIPTION OF PREFERRED EMBODIMENTS

Figure 1:
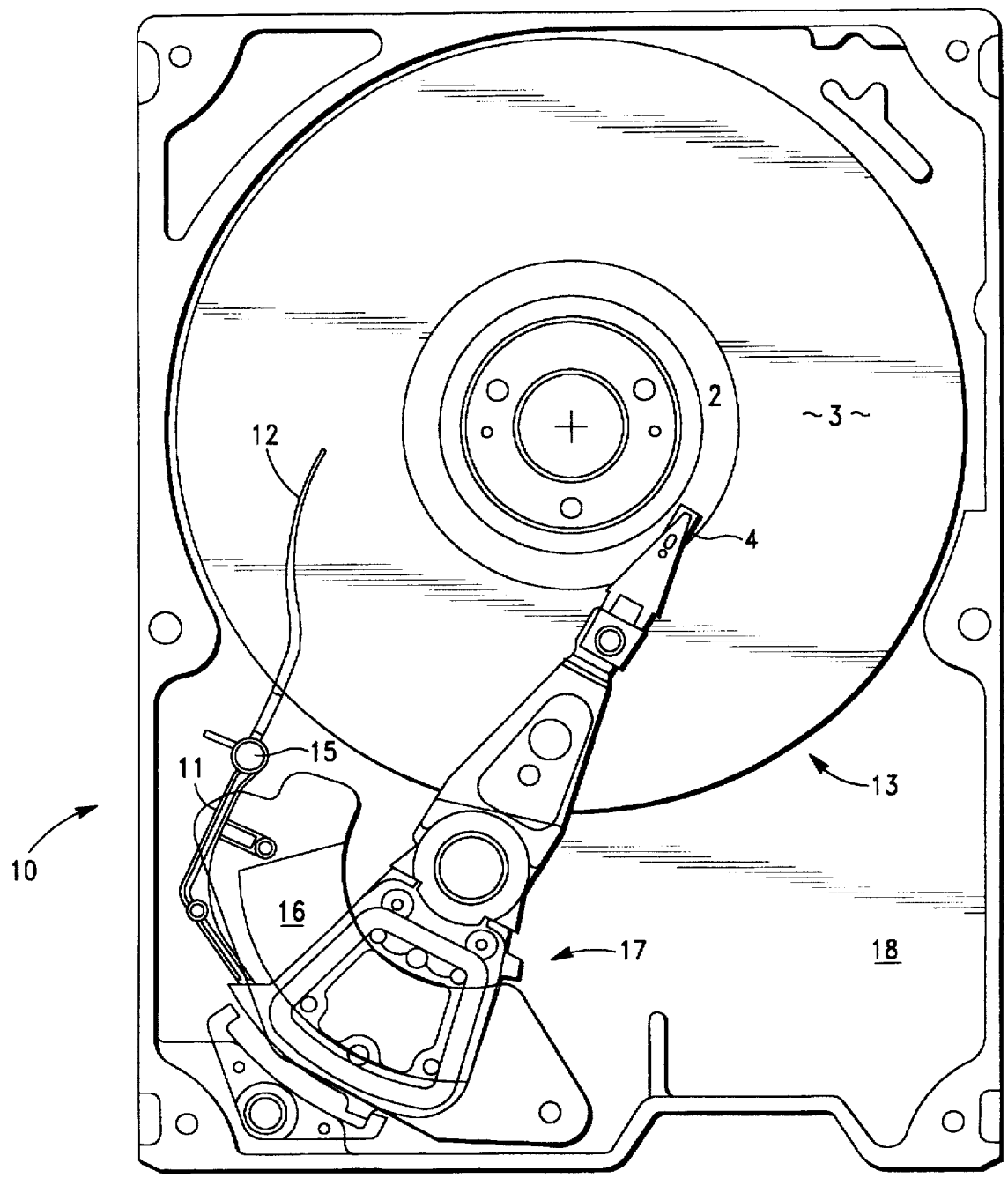
FIG. 1 is a top plan diagrammatic view of a head and disk assembly of a hard disk drive, including a prior art airlock actuator latching mechanism, shown in its latched position.
Figure 2:
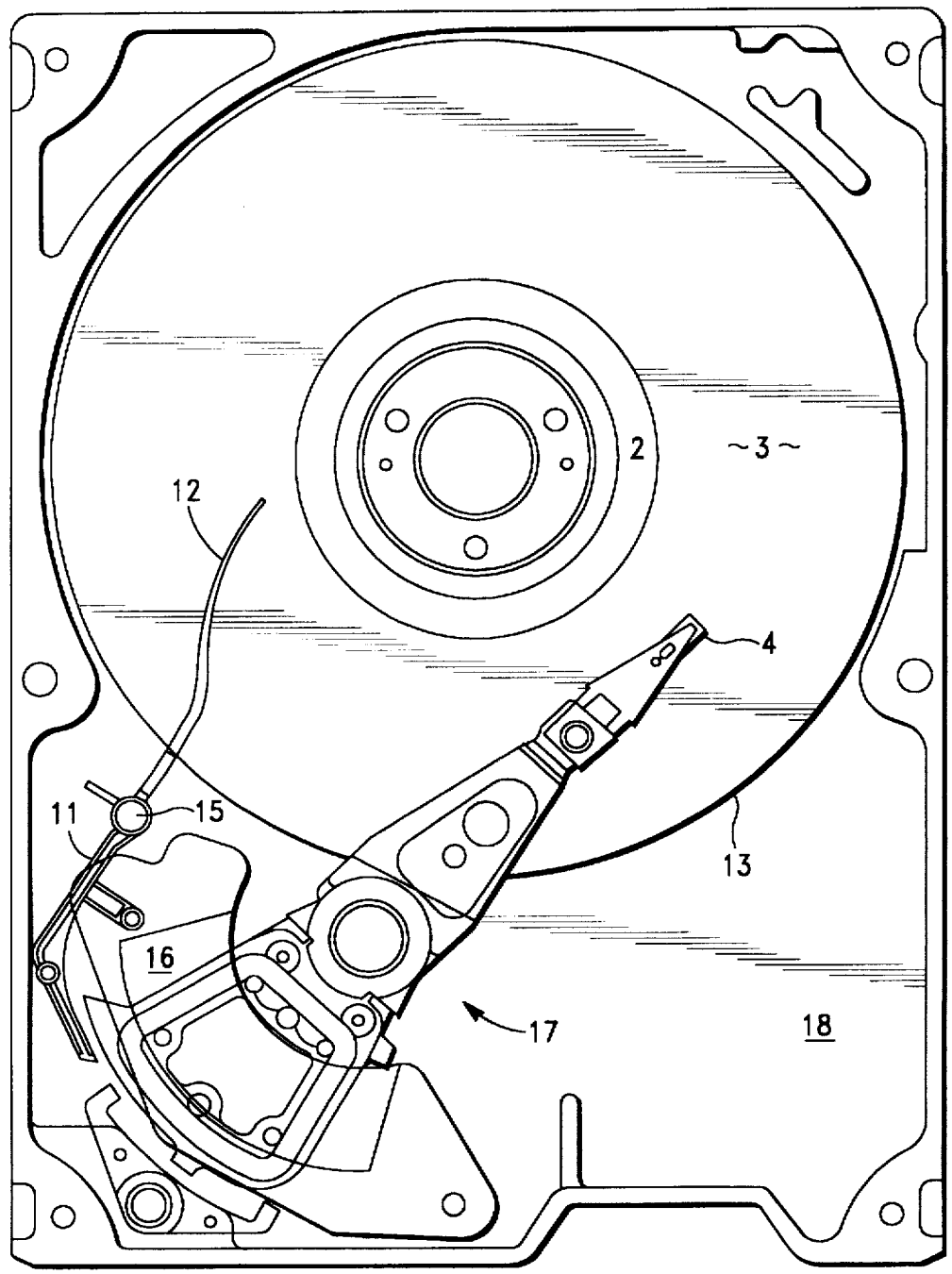
FIG. 2 is a top plan diagrammatic view of the disk drive of FIG. 1, showing an actuator release orientation of the prior airlock actuator latching mechanism after the disk drive is subjected to a rotational shock force.

The details of construction of hard disk drives (HDD's) in which the invention finds utility, are well known to those skilled in the art. Specifically, the assembly and function of HDD components other than those described herein below are discussed in commonly assigned U.S. Pat. No. 5,319,511, entitled, "Aerodynamic Actuator Latch with Magnetic Return Spring for Hard Disk Drive", the disclosure thereof being incorporated herein by reference. As a result the following description omits describing conventional details of HDD structure and assembly methods other than as related to the best mode of the present invention, and as to enable those skilled in the art to practice the present invention.

FIG. 3a shows a plan view of a somewhat simplified hard disk drive 100 in accordance with principles of the present invention. The disk drive 100, as shown, includes a base 44, spindle or hub 46 having an axis of rotation, a data storage disk 45 (shown partially cut away) rotatably mounted to the spindle 46, a rotary transducer actuator assembly 27, and an airlock actuator latch assembly 20. For simplicity, the following discussion describes operation of the disk drive 100 with a single data storage disk 45. However, as those skilled in the art will recognize, the present invention is capable of being used in a disk drive employing a plurality of data storage disks stacked upon a common spindle. Typically, a brushless spindle motor (not shown) is coupled to, or included within, the spindle 46 for rotating the data storage disk 45 at a predetermined angular velocity. The spindle motor is preferably integrated into the hub 46 that supports the data storage disk 45, such that the spindle motor supports and directly rotates the data storage disk 45. The data storage disk 45 is rotated in a counterclockwise direction, as indicated by arrow B, about its axis of rotation.

The data storage disk 45 can have a single surface, or both an upper and lower surface, on which data is stored. Typically, each storage surface of the disk 45 is made very smooth and is coated, plated or deposited with a suitable magnetic material, such as cobalt alloy. However, the storage disk can be optical, magneto-optical, or the like.

The transducer actuator assembly 27 is bi-directionally rotatably journalled to the base 44 about an axis of rotation. The transducer actuator assembly 27 can rotate bi-directionally along a path of e.g. approximately 30 degrees, as indicated by arrow R in FIG. 3a. The transducer actuator assembly 27 includes a transducer assembly 31, comprising a slider-transducer 31a, a load beam 31b, and a swage plate 31c. The transducer assembly 31 is typically swageably mounted to a structural member 32 known as a C-block or E-block. Attached to member 32 is an actuator voice coil motor 49. The transducer actuator assembly can be either a rotary or linear-type assembly, although a rotary assembly is presently preferred.

An inner crash stop 51 extends from the base 44, as shown in FIG. 3a, to limit the rotary travel of the actuator assembly 27 at the inner disk diameter, preventing the actuator assembly 27 from "crashing" into the spindle 46. Similarly, an outer crash stop 52 extends from the base 44 to limit the rotary travel of the actuator assembly 27 at the outer periphery of the disk 45.

The transducer assembly 31 is attached at one end to C-block 32 in a conventional manner, and a voice coil 49 is attached to the other end of the C-block 32 by adhesive or by integral molding thereto. The transducer actuator assembly 27 is mounted to the base 44 by a journal 60 about which the transducer actuator assembly 27 rotates. The journal 60 is disposed adjacent to a peripheral edge of the data storage disk 45 such that the C-block 32 and transducer assemblies extend over the surfaces of the disk 45. Current passing through the actuator voice coil 49 co-acts with fields from permanent magnets (not shown) to rotate the transducer actuator assembly about the journal 60 and accurately position the transducer assembly 31 over concentric data tracks on the surface of the data storage disk 45, to enable transducers to read/write user data.

During disk drive operation, the transducer actuator assembly 27 rotates relative to the surface of the disk 45, as indicated by arrow R, to position the transducer over the desired data tracks. When the actuator voice coil motor 49 is deactivated, the transducer assembly 31 must be positioned to a parking or landing zone 62, on the disk 45, where the transducer assembly 31 will not damage the surface of the disk 45. Typically, the landing zone 62 is an inner annular region of the disk 45 approximate to the spindle 46 and is textured to facilitate contact start/stop operations of the disk drive. The airlock actuator latch assembly 20 of the present invention locks the transducer actuator assembly 27 as the transducer assembly returns to rest in the landing zone 62.

In one preferred embodiment, the airlock actuator latch assembly 20 is disposed beneath the disk 45 and includes a first member 21 and a second member 28. The first member 21, shown in FIGS. 3a and 3b, further includes an integral air vane portion 21a and an integral latching portion 21b and is rotatably mounted to a shaft 22 fixed to the base 44. Like most conventional airlock latch members, the present first member 21 is configured such that it is mass balanced about its own axis of rotation 22. Additionally, the air vane portion 21a extends out under the bottom surface of the disk 45 in close proximity to the disk surface.

The first member 21 may also beneficially be configured with a cavity (not shown) in which an air filter (not shown) can be mounted. The air filter serves to trap any particles which may be present or may be generated inside the disk drive assembly, thereby preventing particles from contaminating the disk surface.

Travel of the first member 21 in the counterclockwise direction is limited by a stop pin 23 while clockwise travel is limited by stop pin 25. Both pins 23 and 25 are mounted to base 44. The first member 21 also includes a mechanical helical torsion spring 26 which biases the latching portion 21b against the actuator assembly 27 in the latched position when the disk 45 is not spinning. The return spring 26 is designed such that the airflow force generated by the disk during spin up (e.g. approx. 2000 rpm) and impinging against the air vane portion 21a, is sufficient to overcome the spring force biasing the first member 21 in the latched position. Those skilled in the art will understand that other types of return springs may be utilized, e.g. a magnetic spring, to achieve the same functional result.

The second member 28 is rotatably disposed about a shaft 29 which is mounted to base 44. The second member 28 includes an air vane portion 28a and like the first member 21, the second member 28 is also mass balanced about its axis of rotation 29. Rotary travel of the second member 28 is limited by stop pins 24 and 25, as shown in FIGS. 3a and 3b. The second member 28 similarly includes a mechanical helical torsion spring 29a which biases the second member 28 into abutting engagement with the first member 21 when the disk 45 is not spinning. The spring 29a is designed such that the airflow force generated during the initial stages of disk spin up (e.g. approx. 200-500 rpm) and impinging against the air vane portion 28a, is sufficient to overcome the spring force biasing the second member 28 in the latched position. Those skilled in the art will understand that other types of return springs may be utilized, e.g. a magnetic spring, to achieve the same functional result. Additionally, the second member 28 should be designed to have low inertia and to be in abutting contact with the first member 21 through the second member's path of rotary travel to increase the second members resistance to rotational shock forces.

During normal operation, the latch of FIGS. 3a and 3b functions much like the conventional air vane latching mechanism. FIG. 3b represents the disk drive 100 of FIG. 3a with the first member 21 in the unlatched position. In this state, where the spindle motor 46 spins the disk 45 in the counterclockwise direction, as indicated by arrow B, airflow generated by the disk 45 during the initial spin up stage, impinges on air vane portion 28a of second member 28, eventually overcoming the return spring torque and causing the second member 28 to rotate in a counterclockwise direction until it contacts stop pin 25 and effectively unlocks the first member 21. Meanwhile, as the disk 45 gains rotational speed, the increased airflow generated by the disk impinges against air vane portion 21a of first member 21, eventually overcoming the return spring force of spring 26, causing the first member 21 to rotate in the clockwise direction until the first member 21 unlatches from the actuator assembly 27. In this unlatched position, the transducer actuator assembly 27 is free to rotate, enabling transducer assembly 31 to move away from the landing zone 62 and into the data zone of the disk 45, as shown in FIG. 3b. When the spindle motor 46 is switched off, the back EMF (electromotive force) of the motor 46 is fed to the actuator voice coil motor 49, causing transducer actuator assembly 27 to rotate counterclockwise until inner stop 51 is reached. Meanwhile, as the disk 45 decelerates, the aerodynamic force on the air vane portions 21a and 28a begin to decrease. At some point, the return spring torque of springs 26 and 29a each becomes greater than the aerodynamic torque, causing the first member 21 to rotate in a counterclockwise direction into the latched position, then causing second member 28 to rotate in the counterclockwise direction into an abutting blocking engagement with the air vane portion 21a of first member 21, as depicted in FIG. 3a.

In accordance with principles of the present invention, while the disk drive 100 is in a latched position, a rotational shock force applied to the disk drive 100 will not unlatch the actuator assembly 27. Specifically, since the first and second members can each rotate in one direction only if the other member rotates in the opposite direction, a rotational shock force cannot be simultaneously applied in two different directions. For example, if a rotational shock force were applied in the counterclockwise direction to the disk drive shown in FIG. 3a, the second member 28 is prevented from rotating in the clockwise direction by stop pin 24. Consequently, the first member 21 also prevented from rotating. Alternatively, if a rotational shock force were applied in the clockwise direction to the disk drive, the second member 28 may rotate. However, the first member 21 is "pushed" tighter into the latching position, against stop pin 23.

FIGS. 4a and 4b illustrate another preferred embodiment. As shown in FIG. 4a, latch assembly 60 includes a first member 61 and a second member 68. The latch assembly 60 is included within a disk drive 101 of FIG. 3a. Structural elements discussed in connection with FIGS. 3a and 3b have the same reference numerals in FIGS. 4a and 4b. First member 61 is structurally similar to first member 21 of FIGS. 3a and 3b, including an air vane portion 61a, a latching portion 61b, a mechanical helical torsion spring 66 for biasing the first member into the latching position, and is rotatably mounted about a shaft in the base 44 and mass balanced thereabout. Second member 68 is also rotatably mounted about the base 44 and mass balanced about its axis of rotation. The second member 68 includes an arm 68a and a ball 68b at the end of the arm 68a. A socket 64 is defined by the first member 61. The ball 68b rotatably seats within the socket 64, thereby coupling the second member 68 to the first member 61.

The first member 61 is designed such that the air vane portion 61a produces enough windage torque to rotate both members 61 and 68, including any friction therein. In addition, the inertias of the two members are closely matched so that the inertia of one member does not dominate the inertia of the other in response to rotational shock forces. In certain applications, the embodiment of FIG. 4a may be preferable to the embodiment of FIG. 3a since the coupling of the two members 61 and 68 solves any rotational timing problems during disk spin up which might exist between the members 21 and 28 of FIG. 3a.

During operation of disk drive 101, the disk 45 spins up, generating airflow which impinges against air vane portion 61a. Eventually the windage torque overcomes the torsional spring force from spring 66 and rotates first member 61 in the clockwise direction until the actuator assembly 27 is unlatched. Accordingly, the clockwise rotation of the first member induces a counterclockwise rotation of second member 68.

In the latched position, the members 61 and 68 are inertially "matched" such that a rotational shock force which would otherwise cause the first member 61 to rotate and unlatch, is counterbalanced by a reaction force induced in the second member 68 from the same rotational shock force. For example, a rotational shock force in the counterclockwise direction applied to the disk drive 101, which would otherwise cause the first member 61 to rotate in the clockwise direction, also causes the second member 68 to rotate in the clockwise direction. Since the first member can only rotate in one direction if the second member rotates in the other direction, the first member 61 is prevented from clockwise rotation.

It should also be understood that linear accelerations applied to the disk drive 101 cannot induce a rotational movement in a balanced body. Since both the first member and the second member of each of the two embodiments described herein are balanced about their respective axes of rotation, as discussed above, the members are also highly resistant to purely linear shocks. Thus, any linear components of a rotary shock force can be ignored.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. An airlock actuator latch assembly for restraining a transducer actuator assembly in a disk drive having at least one disk, the latch assembly comprising:

a first member rotatably mounted about a base of the disk drive, the first member engaging the actuator assembly while the disk is not spinning, the first member releasing engagement with the actuator assembly when a rotary shock force is applied to the disk drive;

a second member rotatably mounted about the base, the second member blocking the first member so as to negate the rotation and subsequent releasing of the first member with the actuator assembly when the rotary shock force is applied to the disk drive; and the second member further being deflectable by airflow generated by disk rotation and releasing engagement with the first member when the disk is spinning.

2. The airlock actuator latch assembly of claim 1 wherein the first member is deflected by airflow generated by disk rotation so as to further release engagement with the actuator assembly when the disk is spinning.

3. The airlock actuator latch assembly of claim 2 wherein the first member releases engagement with the actuator assembly after the second member releases engagement with the first member.

4. The airlock actuator latch assembly of claim 1 wherein the first member rotates in a first direction only when the second member rotates in the direction opposite the first direction.

5. The airlock actuator latch assembly of claim 1 further comprising a first means for preventing the first member from disengaging with the transducer actuator assembly when a rotational shock force in the clockwise direction is applied to the disk drive.

6. The airlock actuator latch assembly of claim 5 further comprising a second means for preventing the second member from disengaging with the first member when a rotational shock force in a counterclockwise direction is applied to the disk drive.

7. The airlock actuator latch assembly of claim 1 wherein the first member is biased into engagement with the actuator assembly by a first biasing means when the disk is not spinning.

8. The airlock actuator latch assembly of claim 7 wherein the second member is biased into engagement with the first member by a second biasing means when the disk is not spinning.

9. The airlock actuator latch assembly of claim 1 wherein the first member has an inertia greater than a second inertia of the second member.

* * * * *